Oct. 21, 1958 J. PLÖEN 2,857,530
CURRENT EQUALIZATION DEVICE FOR CONDUCTORS TO THE ELECTRODES
IN ALTERNATING CURRENT ELECTRO-FURNACES
Filed Oct. 22, 1956

INVENTOR
J. PLÖEN

BY *Attys.*

United States Patent Office 2,857,530
Patented Oct. 21, 1958

2,857,530

CURRENT EQUALIZATION DEVICE FOR CONDUCTORS TO THE ELECTRODES IN ALTERNATING CURRENT ELECTRO-FURNACES

Jan Plöen, Oslo, Norway, assignor to Christiania Spigerverk, Oslo, Norway

Application October 22, 1956, Serial No. 617,622

Claims priority, application Norway October 25, 1955

4 Claims. (Cl. 307—147)

In alternating current electro-furnaces the current is usually supplied from the transformer to the electrodes through several parallel conductors. As the electrodes necessarily have to be freely raised and lowered, the current supply is normally effected by means of a system of conductors with a section of bars from transformer terminals followed by a section with flexible cables, giving the necessary mobility. These are in turn connected to bars on the furnace, these bars being connected to the electrode clamping device. Water-cooled pipes are occasionally used instead of bars. The currents being normally high, demand numerous parallel conductors, say 10 or more.

Powerful strayfields are created round the conductors due to the action of the current, reducing the current in some conductors and increasing it in others. An unequal current distribution in the conductors of one phase can also be caused by the fields from the other phases, the distance between the phases being relatively small compared with the distance between the parallel conductors of one phase. The stabilizing ohmic resistance in such a conductor system is small, for which reason the current in the various parallel conductors is very unequal. This occurrence of uneven current distribution results in poor utilization of the conductors, giving a high temperature to some heavily loaded conductors and considerably greater loss in transmission than if the distribution had been equal.

The poor utilization of the cross section requires a greater number of cables than in the case of even distribution resulting in heavy maintenance costs, and difficult suspension arrangement.

It may be mentioned too that the concentration of strayfields caused by uneven distribution of current increases the magnetic fields caused by certain conductors, extremely agitating the conductors. Such agitation may short-circuit the phases and increase the stresses in the cables, distance units and eventual insulating screens.

Moreover, an unequal distribution of current increases the reactance of the system and the reactive effect.

Attempt has been made to solve these problems by coupling the conductors magnetically in pairs, in such a way that all the conductors are magnetically linked together as described in the copending U. S. patent application Ser. No. 491,149 of February 28, 1955. According to said application this can be accomplished, for example, by passing the conductors in each pair in opposite directions through a laminated core. With the exception of the two conductors forming the first and last link of the magnetic chain, each conductor is magnetically coupled to two of the other conductors, the conductors being consecutively led through two laminated iron cores. A closed magnetic chain can also be effected by coupling magnetically the first and last link.

The various iron cores can be substituted by one single core with holes for the different conductors. In this case the voltages induced between the conductors will add together from a point of symmetry depending on the circuit. This relationship causes that the weight of the iron core will increase more than a corresponding increase in number of conductors. This condition is felt especially when several conductors are arranged in two or more plans.

According to the present invention this successive increase in the voltages is reduced by arranging the conductors in groups, each furnished with a main conductor, and equalizing the current in said main conductors by means of iron cores. The current equalization between the separate conductors in the various groups is obtained in a manner as described in said copending U. S. application.

The invention is illustrated on the accompanying drawing, in which:

Fig. 1 shows the arrangement for one phase, while

Figure 1:
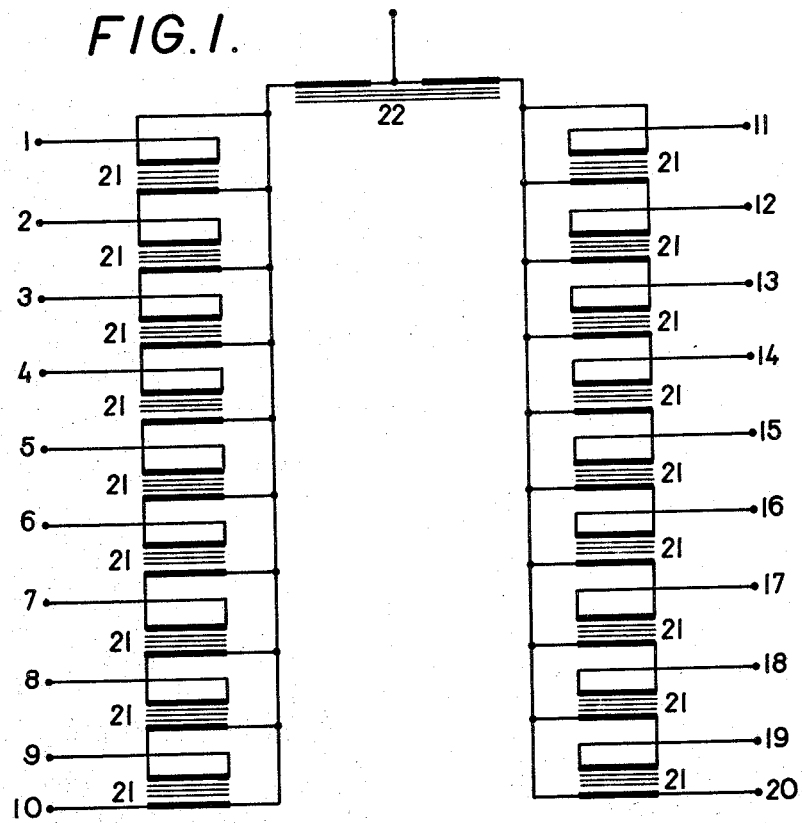

On the embodiment shown one has assumed 20 wires per phase in two parallel, vertical planes with 10 wires in each plane. The wires for the phase shown on Fig. 1 are designated 1, 2, 3 . . . 20. Between the said planes a voltage is induced from the remaining phases. This voltage is absorbed by a separate iron core 22, while the remaining voltages, induced between the conductors in each plane are absorbed by the iron core 21, as described in U. S. patent application Ser. No. 491,149.

Figure 2:
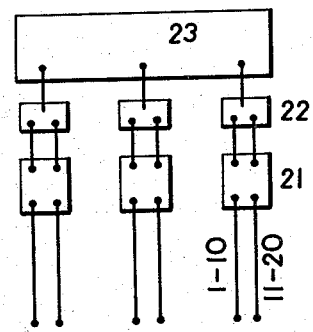
Fig. 2 is in a smaller scale a view showing schematically the arrangement of all three phases.

If so desired one may employ two or more iron cores instead of the single core 21. The numeral 23 on Fig. 2 indicates a transformer.

As illustrated by the foregoing example of one embodiment of the present invention, the voltage propagated between the two planes will not contact or affect the iron core 21 at all.

This means that the iron core 21 may be of considerably smaller size than if it should absorb the voltage induced between the two wire planes, and the decrease in weight of this core will be larger than the weight of the core 21, thus resulting in a smaller total weight.

The foregoing description of a preferred embodiment of the invention shall not in any way be understood as limiting for the invention but serves only to illustrate the same. The scope of the invention is only determined by the appending claims.

I claim:

1. Means for conducting substantially equal alternating currents over a plurality of paths, said means comprising a group of a plurality of conductors and a common conductor individually connected to the conductors in each group, the conductors in each group each being magnetically linked to one of the other conductors in said group and through the said one other conductor to all of the conductors in said group, and the said main conductors each being magnetically linked to one of the other main conductors and through the said other main conductor to all of said main conductors.

2. Means for conducting substantially equal alternating currents over a plurality of paths comprising in combination a plurality of groups of separate adjacent conductors, a plurality of iron cores, one for each two adjacent conductors in each group, each two adjacent conductors in each group being positioned in relation to the iron core so that the instantaneous current flow in one conductor is in the opposite direction to the instantaneous current flow in the other conductor whereby the two adjacent conductors are magnetically coupled by the iron core, a plurality of common main conductors, one connected to all the conductors in each of said groups, and an iron core for each two main conductors, each two main conductors being positioned in relation to the iron core therefor so that the instantaneous current flow in one main conductor is in the opposite direction to the instantaneous current flow in the other main conductor and the two main conductors are magnetically coupled by the iron core.

3. Means as claimed in claim 2 in which said iron cores for the conductors in each group are a single core having a plurality of apertures therein, each aperture having two adjacent conductors extending in opposite directions therethrough.

4. Means as claimed in claim 2 in which said iron cores for the conductors in all said groups are a single core having a plurality of apertures therein, each aperture having two adjacent conductors extending in opposite directions therethrough.

References Cited in the file of this patent

UNITED STATES PATENTS

| | | |
|---|---|---|
| 1,127,475 | Marshall | Feb. 9, 1915 |
| 1,551,275 | Wagner et al. | Aug. 25, 1925 |
| 1,729,713 | Dicke | Oct. 11, 1929 |
| 2,368,998 | Nissim | Feb. 6, 1945 |
| 2,373,906 | Mouradian | Apr. 17, 1945 |
| 2,786,152 | Fisher | Mar. 19, 1957 |